United States Patent [19]
Kukuljan et al.

[11] Patent Number: 5,539,975
[45] Date of Patent: Jul. 30, 1996

[54] CONTROL SYSTEM AND EQUIPMENT CONFIGURATION FOR A MODULAR PRODUCT ASSEMBLY PLATFORM

[75] Inventors: Z. Val Kukuljan; George T. Plonski, both of Milwaukee County, Wis.

[73] Assignee: Allen-bradley Company, Inc., Milwaukee, Wis.

[21] Appl. No.: 118,536

[22] Filed: Sep. 8, 1993

[51] Int. Cl.[6] .................................................. B25P 21/00
[52] U.S. Cl. ................................ 29/701; 29/720; 29/711; 29/794; 901/7; 901/47; 198/346.2
[58] Field of Search ............................. 29/701, 712, 721, 29/791, 794, 430, 711, 720; 901/7, 47; 198/346.2

[56] References Cited

U.S. PATENT DOCUMENTS

| | | | |
|---|---|---|---|
| 4,209,898 | 7/1980 | Aoki et al. | 29/794 X |
| 4,306,646 | 12/1981 | Magni | 198/346.1 X |
| 4,369,872 | 1/1983 | Sticht | 901/7 X |
| 4,628,464 | 12/1986 | McConnell | 29/721 X |
| 4,674,181 | 6/1987 | Hamada et al. | 29/720 X |
| 4,783,904 | 11/1988 | Kimura | 901/7 X |
| 5,005,277 | 4/1991 | Uemura et al. | 29/712 X |

Primary Examiner—Timothy V. Eley
Assistant Examiner—Khan V. Nguyen
Attorney, Agent, or Firm—John J. Horn; George A. Montanye

[57] ABSTRACT

A modular product assembly platform which includes a multiple number of industrial robots or other similar assembly devices. The product assembly platform also includes a programmable controller system housed in a logic control cabinet, a vision control system housed in a vision control cabinet and a set of robot controllers which operate together to control the robots or assembly devices for performing product assembly tasks. The layout and configuration of the platform and the control equipment provide for convenience and flexibility in configuring and reconfiguring the assembly platform for different assembly procedures associated with different products.

11 Claims, 10 Drawing Sheets

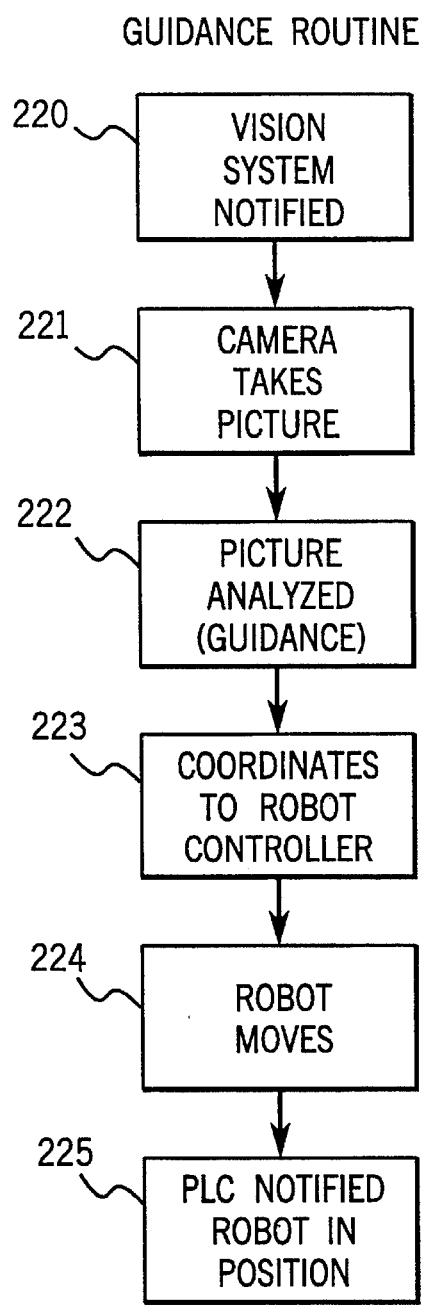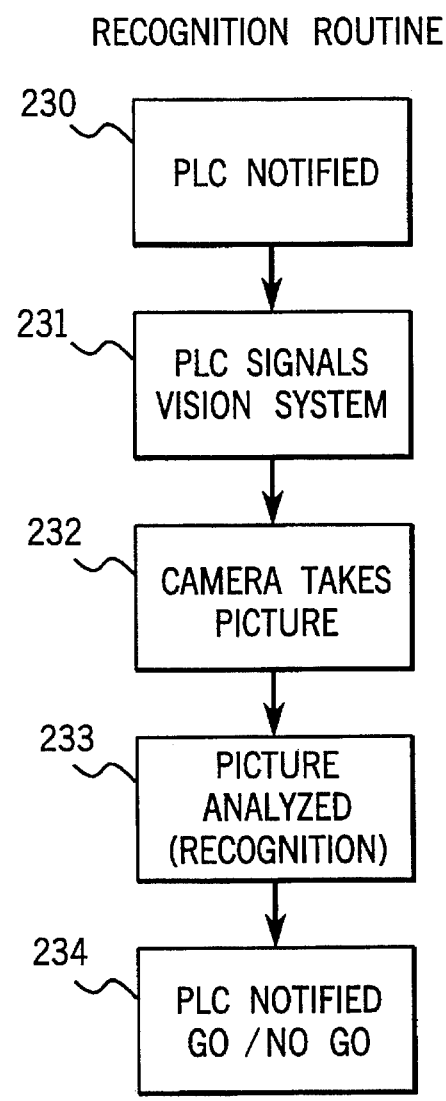

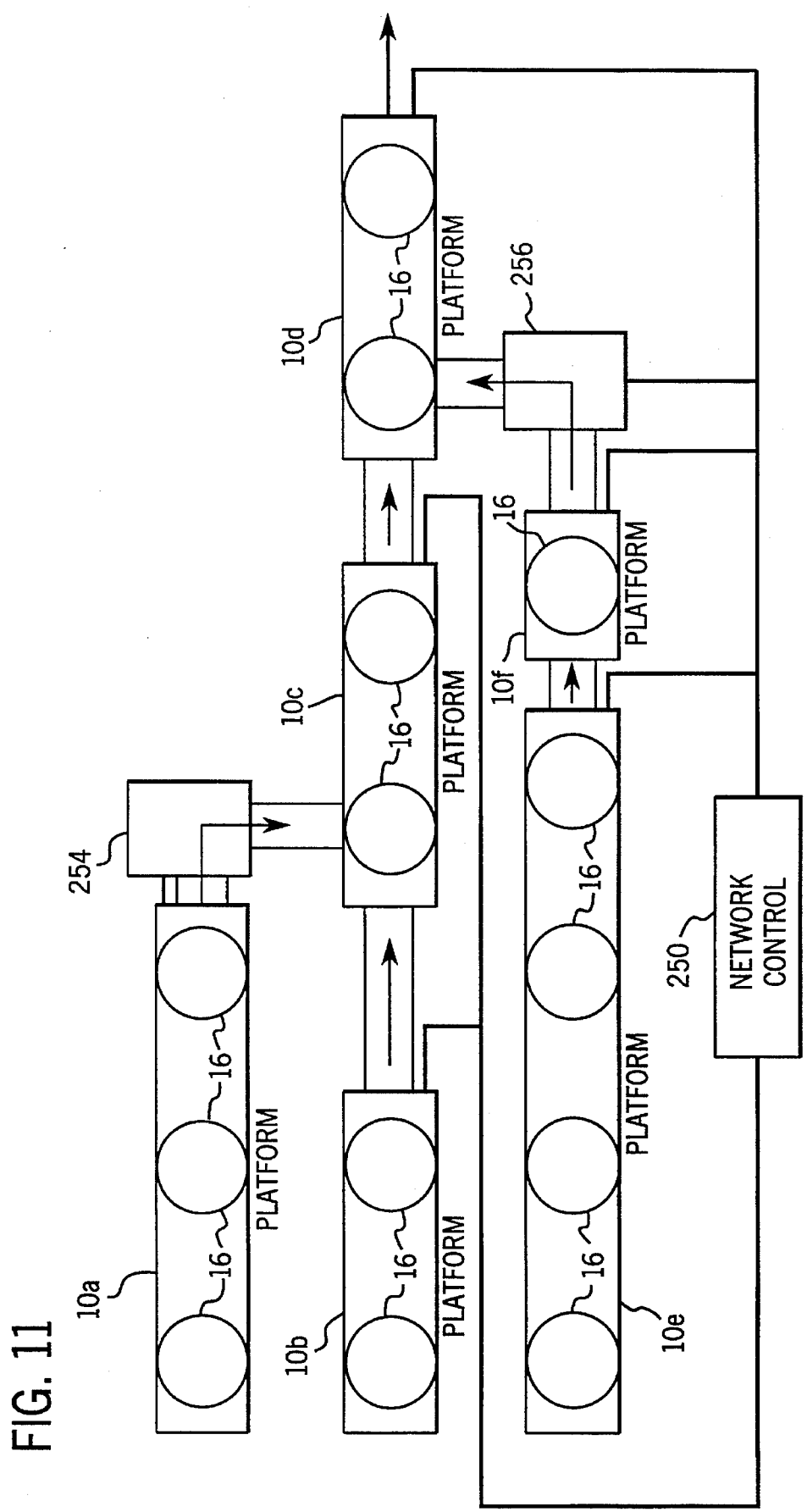

CONTROL SYSTEM AND EQUIPMENT CONFIGURATION FOR A MODULAR PRODUCT ASSEMBLY PLATFORM

BACKGROUND OF THE INVENTION

The present invention relates to industrial automation equipment and more particularly relates to modular platform units for performing product assembly procedures.

In the past, product assembly processes have usually been performed by custom designed assembly machinery which have been dedicated to particular assembly tasks. In accordance with this conventional approach the design and construction of automated assembly lines required enormous engineering expenditures and involved high risks to prove functional equipment compliance. Furthermore, once such assembly lines were constructed, they were completed specialized to the limited applications for which they were built and were not reusable for the assembly of different products. The assembly units making up the assembly line could be recovered in the event manufacturing operations were discontinued, however, in most cases, extensive redesign and reconstruction was necessary to adapt the equipment for use in assembling new products.

It is therefore an object of the present invention to provide a control system and configuration for a modular product assembly platform that allows for the platform to have flexibility and reusability characteristics so that the platform can be adapted for assembling alternate or different products with a minimum of cost and effort.

It is a further object of the present invention to provide a control system and configuration for a modular product assembly platform which allows for the efficient and effective use of assembly robots and machine vision equipment.

It is yet another object of the present invention to provide a control system and configuration for a modular product assembly platform wherein the system is generically programmable and is interfaced with adaptable robotic configurations.

It is a yet further object of the present invention to provide a control system and configuration for a modular product assembly platform which facilitates factory automation projects, allows platforms to be brought together to perform different types of assembly procedures and optimizes production efficiency in terms of equipment utilization, control and cycle time requirements.

SUMMARY OF THE INVENTION

The present invention constitutes a control system and equipment configuration for a modular product assembly platform which includes a multiple number of industrial robots or specialized product assembly machines. The robots are detachably mounted on a specially designed platform deck and include moveable robot arms on which video cameras may be mounted as part of a machine vision system and tooling adapted for performing product assembly tasks. Robot controllers for separately directing the operation of the individual robots are mounted underneath the deck. A general purpose programmable controller for controlling the assembly process across the entire platform is mounted in a cabinet at one end of platform. A user configurable machine vision system is mounted in a cabinet at the other opposite end of the platform for use in identifying and locating parts in coordination with the operation of the robots. The product assembly platform also includes a conveyance system for transporting parts and products under assembly across the deck past the robots. The robot controllers are configured for controlling the "geographic" positioning of the moveable arms of the robots. The vision system provides information for recognition of parts and the proper alignment and positioning of parts and robot arms. The programmable controller system provides overall control and coordination for the robots, vision system, robot controllers, assembly tooling on the robot arms and the conveyance system.

In operation, either stationary or robot arm mounted video cameras are positioned so that the parts to be worked on will be located in their field of view. Either the programmable controller or one of the robot controllers commands the vision system to capture images (take a picture) of the parts. The stored image attributes are analyzed by the vision system per preprogrammed instructions. For "recognition" type applications such as presence sensing and gauging, the information is provided to the programmable controller for subsequent operation. For robot "guidance" type applications, the coordinate location and rotary position of the part is determined by the vision system in conjunction with the robot controller's calibration function. The information is used by the robot controller to position the robot arm mounted tooling to perform the required task. When the tool is in position, the programmable controller signals the tooling to execute the product assembly task associated with each assembly process step. The programmable controller signals the robot controllers and the vision equipment to proceed from one assembly process step to another in coordination with the operation of the conveyance system as parts proceed across the platform in accordance with the desired assembly procedure.

BRIEF DESCRIPTION OF THE DRAWINGS

FIGS. 10A, 10B and 10C provide flowcharts depicting the steps in typical product assembly steps corresponding to the block diagram view of FIG. 9 in accordance with the present invention.

FIGS. 11 provides a block diagram illustrating the use of various size assembly platforms to implement a multi-step assembly process for a factory assembly line.

DESCRIPTION OF THE PREFERRED EMBODIMENT

Figure 1:
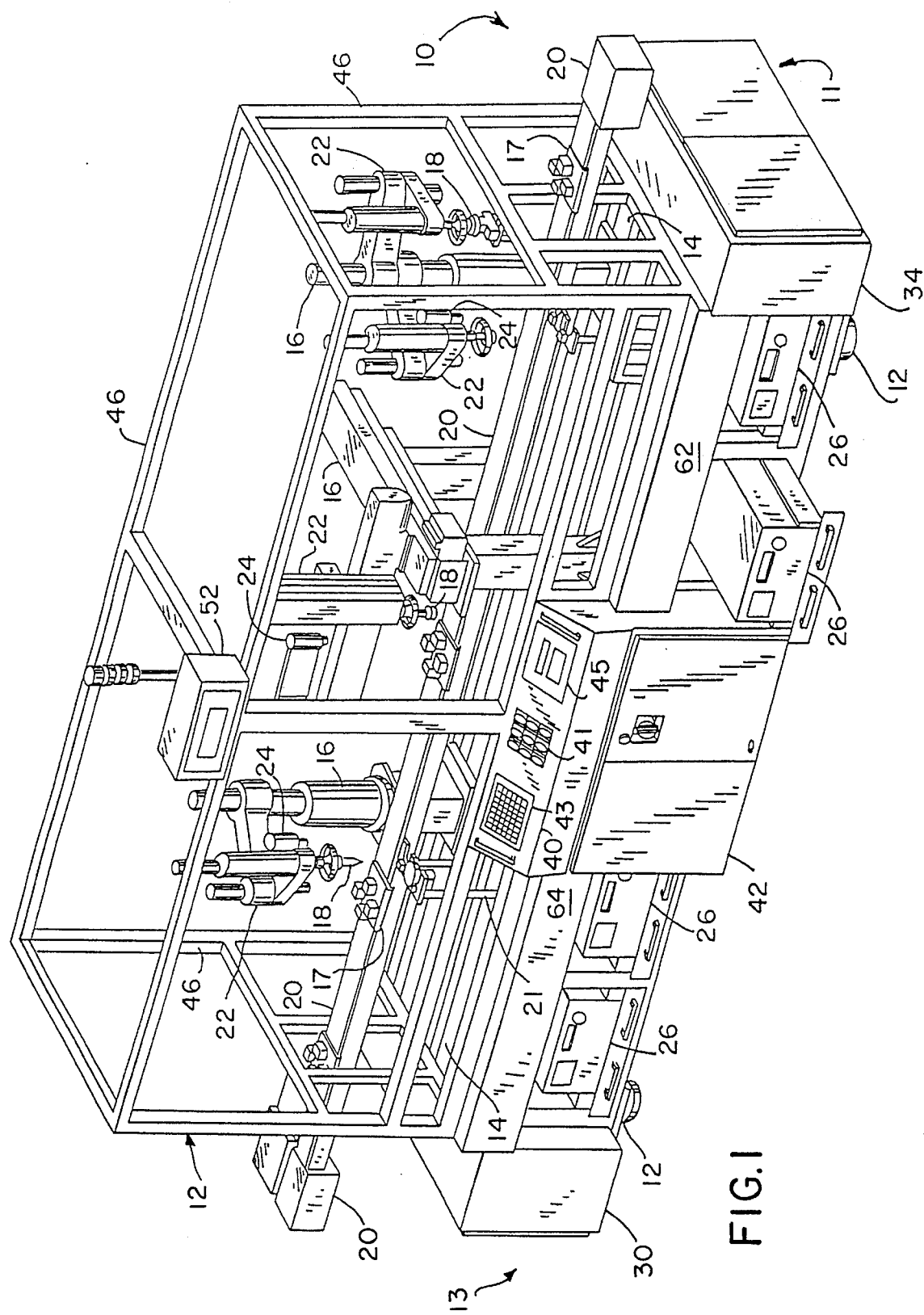
FIG. 1 provides an elevated perspective view of a modular product assembly platform in accordance with the present invention.
Figures 2A, 2B:
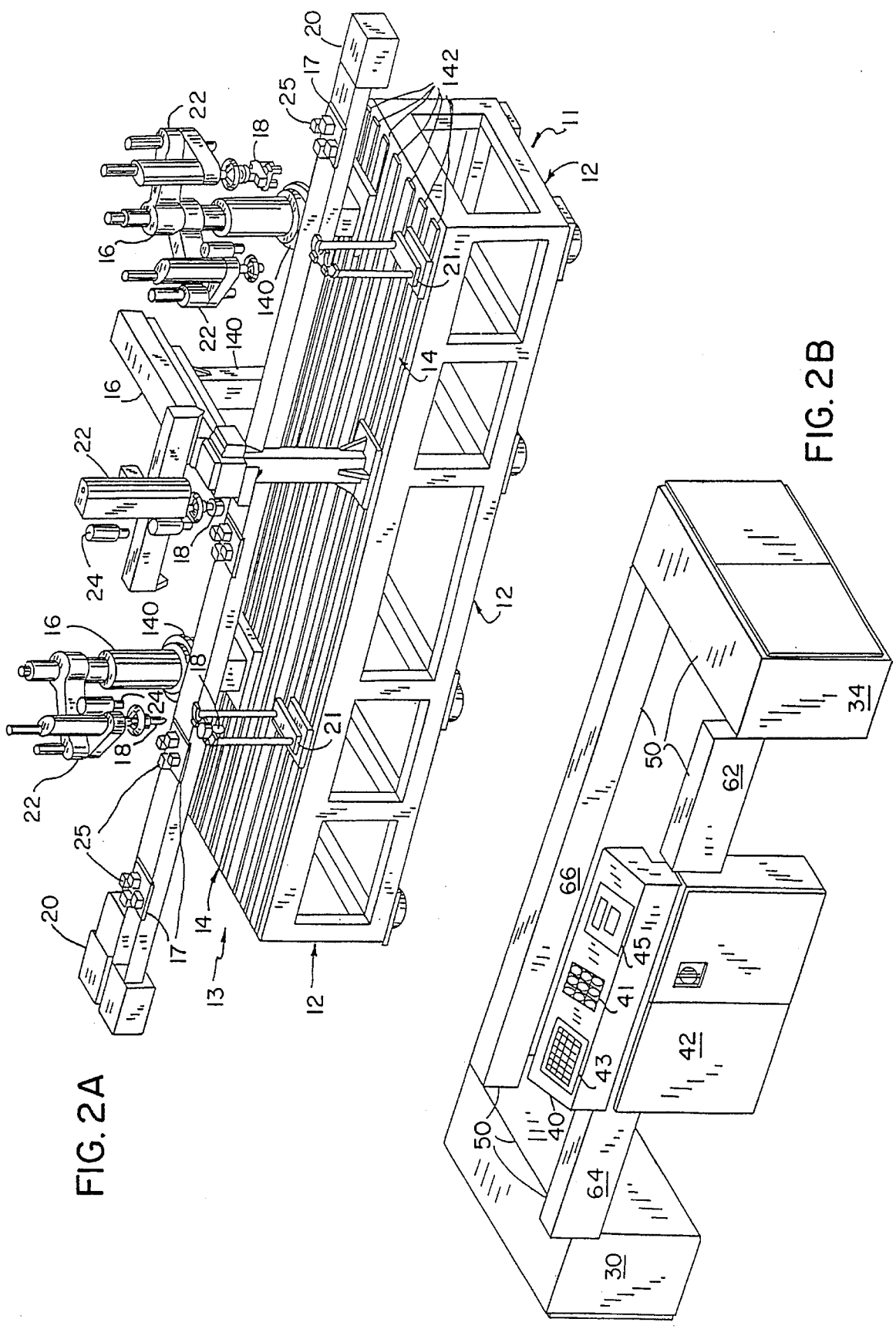
FIG. 2A provides an elevated perspective view of the frame, raised deck, robots and conveyance system of a modular product assembly platform in accordance with the present invention.
FIG. 2B provides an elevated perspective view of control cabinets and wiring cabinets of a modular product assembly platform in accordance with the present invention.

Referring now to FIGS. 1, 2A and 2B, a modular product assembly platform 10 is shown as including a frame 12 having a raised deck 14 on which a set of three industrial product assembly robots 16 are removably mounted. The platform 10 also includes a conveyor 20 for transporting parts 25 on trays 17 from the near end 11 of the deck 14 to the far end 13 of the deck 14 past the robots 16. The robots 16 comprise conventional industrial robots (one of which is a cartesian robot and two of which are SCARA robots) having movable arms 22 and specialized tools 18 such as grippers, screwdrivers, welding appliances and the like attached to the outer ends of the movable arms 22 for performing product assembly tasks. Support stands 21 are adapted for storing alternative robot tools or tooling 18 which may be interchangeably used by the robots 16. Video cameras 24 are mounted either on the arms 22 of the robots 16 or on stationary supports for recognition and location detection of the parts 25 on the trays 17 being worked on by the robots 16.

The arms 22 of the robots 16 are individually controlled by three robot controllers 26 installed in bays 28 underneath the deck 14 and by a programmable controller system 90 (see FIG. 4) mounted within a logic control cabinet 30 at the far end 13 of the platform 10. The robot controllers 26 control positioning of the movable arms 22 on the robots 16 while the programmable controller 90 regulates the assembly process steps to be performed and, in particular, controls the operation of the tooling 18 in coordination with the selection of the movement steps to be performed by the robot arms 22. The video cameras 24 are controlled by a vision control system 110 (see FIG. 5) mounted within a vision control cabinet 34 on the near end 11 of the platform 10 which in turn operates under direction of the programmable controller system 90 at the far end 13 of the platform 10 in the cabinet 30. The control console 40 provides an operator interface for allowing operator control over the machinery on the platform 10 while the power control cabinet 42 houses various electrical power distribution and control elements subject to regulation by the operator through the use of the control console 40. The control console 40 includes a set of power control pushbuttons 41 for manually turning platform machinery on and off, an input panel 43 for manual sequencing of platform machinery through their control programs and a numerical keypad and corresponding LCD display 45 for entry of control parameters and the like. A wiring and communications conduit 50 comprised of wiring and control cabinets extends around the periphery of the raised deck 14 for housing power distribution, control and communication lines as well as small size relays and terminal strips mounted on DIN rails. The conduit 50 includes the cabinets 42, 64, 30, 62, 34 and 66 which form a continuous ring encircling the entire platform deck 14. A data display unit 52 is mounted above the console 40 for displaying operating information and especially platform operating fault notices in response to signals from the programmable controller system 90. The superstructure 46 may be used to house pneumatic lines for providing pneumatic power along the edge of the deck 14 from alongside the conduit 50.

In operation, the platform 10 provides for parts 25 to be transported past the robots 16 on the conveyor 20. The robots 16 may perform various assembly tasks on the parts 25 as they pass by on the conveyor 20 in accordance with programs executed by the programmable controller system 90 in the cabinet 30 as selected by the operator through the use of the control console 40. The vision control system 110 within the cabinet 34 provides parts recognition and robot arm guidance information to the robot controllers 26 and the programmable controller system 90 in the cabinet 30. The configuration of the platform 10 allows for a great deal of flexibility in programming and reprogramming the overall system represented by the platform 10 for accomplishing different sets of assembly tasks on different types of products.

Figure 3:
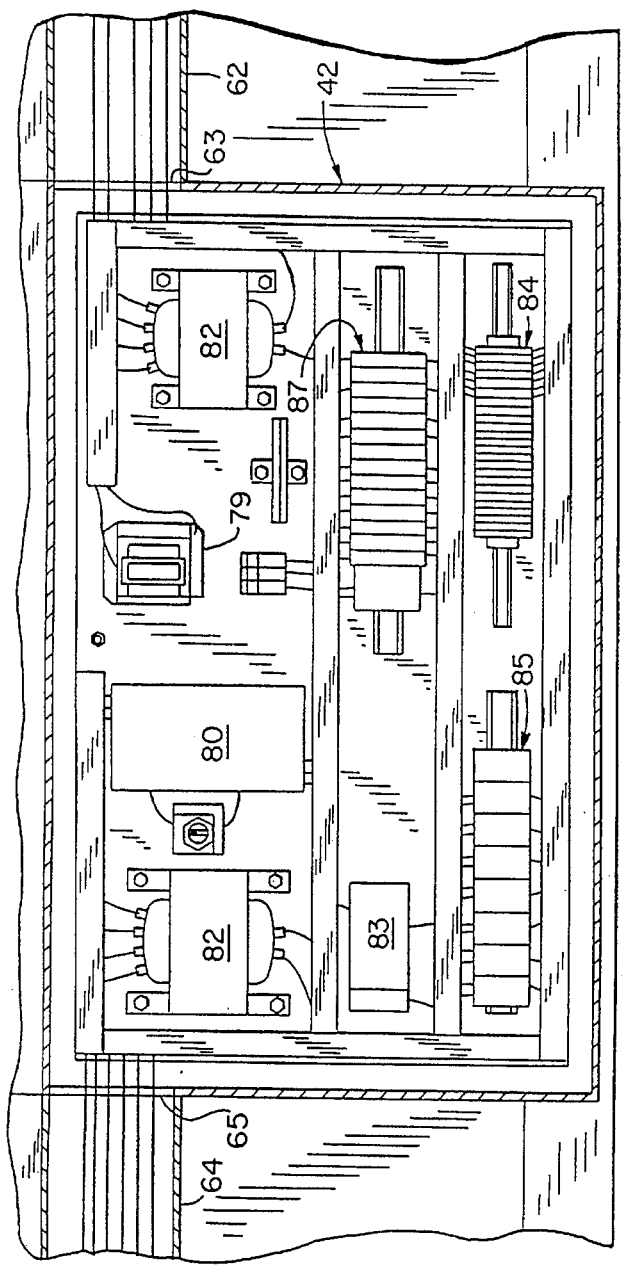
FIG. 3 provides a plan view of the inside of a typical power control cabinet for a product assembly platform in accordance with the present invention.

Referring now to FIG. 3, the power control cabinet 42 comprises a sheet metal enclosure which can be accessed through two outward opening doors. The cabinet 42 houses a main disconnect switch 79, a motor drive unit 80 for the conveyor 20, two control circuit transformers 82, a DC power supply 83, a set of terminal strips 84 for making electrical control and power distribution connections, a set of control relays 85 and a set of overload relays 87. The transformers 82 provide AC power to the electrical machinery mounted on the platform 10 such as the robots 16. The motor drive 80 controls the operation of the conveyor 20. The terminal strips 84 enable the motor drive 80, transformers 82, relays 85 and 87 and power supply 83 to be conveniently interconnected with the console 40 and the electrical machinery of the platform 10. The cabinet 42 is connected to the cabinets 64 and 62 at openings 63 and 65 for enabling the passage of power, control and communications lines.

Figure 4:
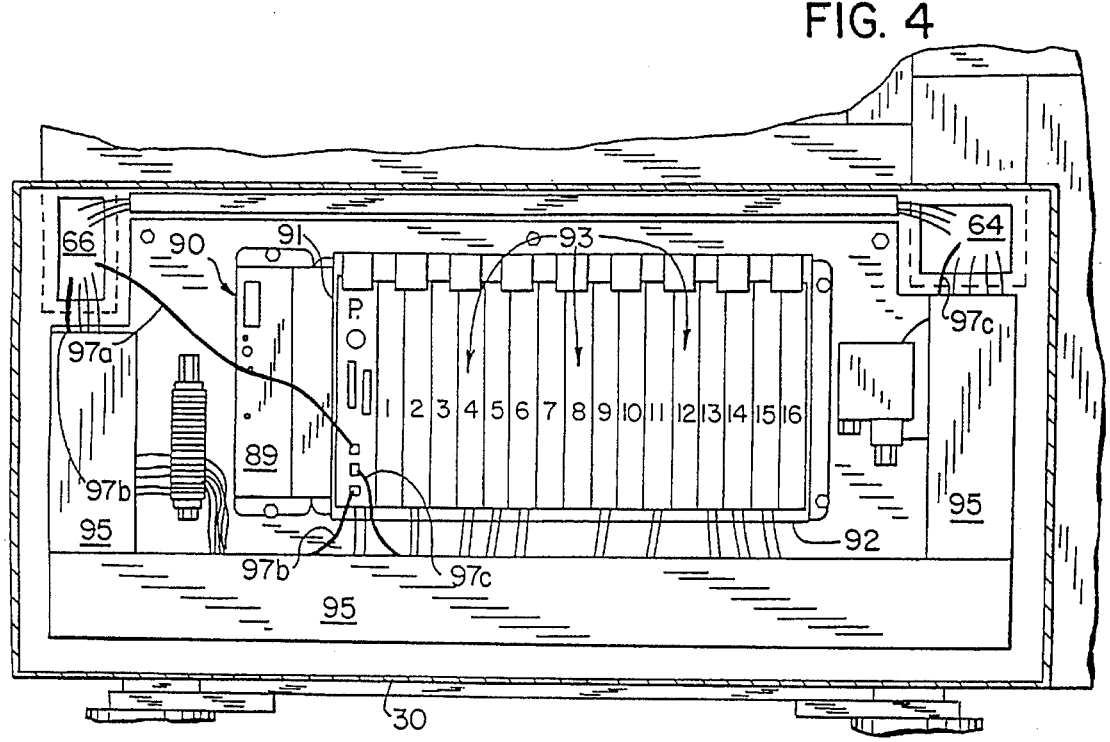
FIG. 4 provides a plan view of the inside of a typical logic control cabinet for a product assembly platform in accordance with the present invention.

Referring now to FIG. 4, the logic control cabinet 30 comprises a sheet metal enclosure which can be accessed through two outward opening doors. The cabinet 30 houses a conventional programmable controller system 90 having a chassis 92 in which power supply, logic processor, and I/O modules are mounted. In the present case the programmable controller system 90 comprises a power supply 89, a logic processor module 91 and sixteen I/O modules 93. The system 90 allows control instructions in the form of an industrial control program such as ladder logic programs resident in the memory of the logic processor module 91 to be executed to examine the state of selected inputs at modules 93 and thereafter control the state of selected outputs at modules 93 depending upon the state of one or more of the inputs. Large numbers of inputs may be examined by the system 90 at the same time as it controls large numbers of outputs. The wiring by which the system 90 is connected to sensing and control output devices (such as tooling 18) is generally directed through the casing 95 within which multiple terminal strips are mounted for establishing the required electrical interconnections. The communication cables 97a, 97b and 97c connect communication ports on the processor module 91 to the remote I/O rack 100

(FIG. 5), the vision system 110 (FIG. 5), control console 40 and data display unit 52 via conventional packet network communication links. The power, control and communication lines for the system 90 pass through conduits 62 and 66 to the sensing devices, electrical machinery and the control equipment of the platform 10 which work under the control of the programmable controller system 90.

Figure 5:
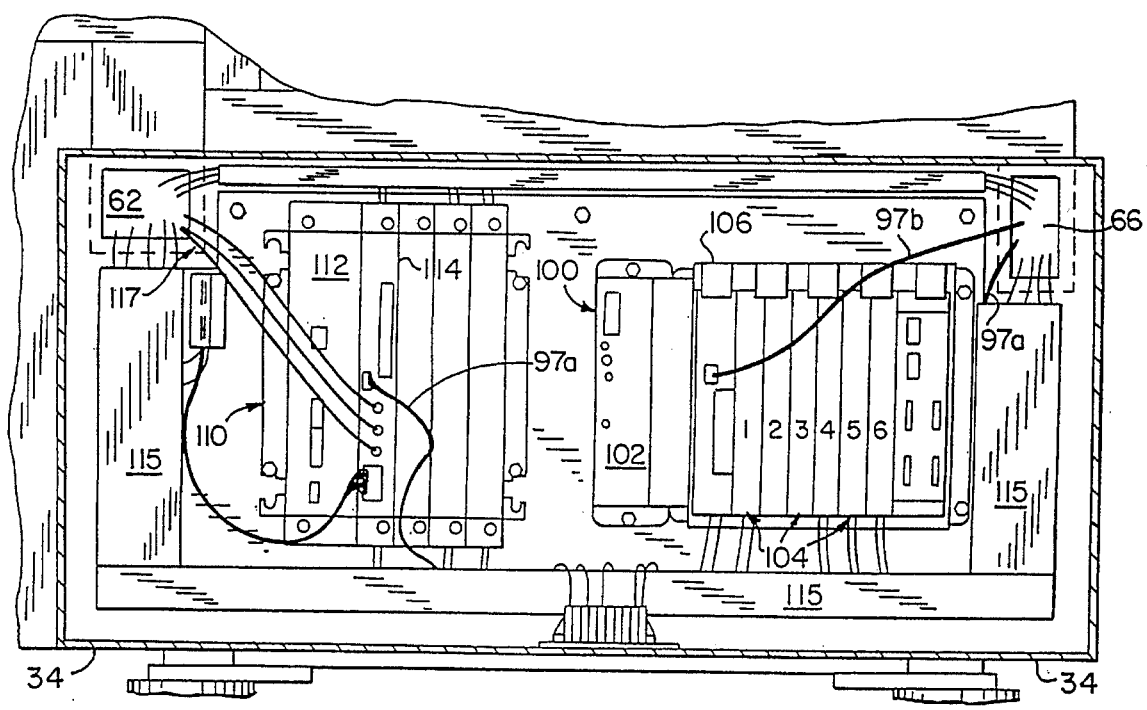
FIG. 5 provides a plan view of the inside of a typical vision control cabinet for a product assembly platform in accordance with the present invention.

Referring now to FIG. 5, the vision control cabinet 34 comprises a sheet metal enclosure which can be accessed through two outward opening doors. The cabinet 34 houses a remote I/O rack 100 containing a power supply module 102, six remote I/O modules 104 and a communications adapter module 106. The communications adapter module 106 links the remote I/O rack 100 to the programmable controller system 90 by way of the cable 97b connected to a communications port on processor module 91 in the chassis 92. The remote I/O rack 100 allows for input and output services related to the control program of the system 90 to be resident at the near end 11 of the platform 10 within the cabinet 34. The cabinet 34 also contains a user-configurable vision control system 110 which is adapted for receiving video input from the video cameras 24. The vision control system 110 includes a power supply 112 and a vision control module 114 having the capability of working with multiple video cameras (although multiple vision control modules 114 could be used). The vision control module 114 is separately connected by the video signal cables 117 to each of the video cameras 24 on the robots 16. The vision module 114 is also connected to the robot controllers 26 and is connected to the programmable controller system 90 via the communications cable 97a which is connected to one of its communications ports for establishing a communications network link with the controller system 90. The vision system 110 may also communicate with the controller system 90 by way of the I/O rack 100. The wiring by which the systems 100 and 110 are connected to the sensing and control output devices is generally directed through the casing 105 within which multiple terminal strips are mounted for establishing the required electrical interconnections. The power, control and communications lines for the systems 100 and 110 pass through the cabinets 64 and 66 of the conduit 50.

Figure 6:
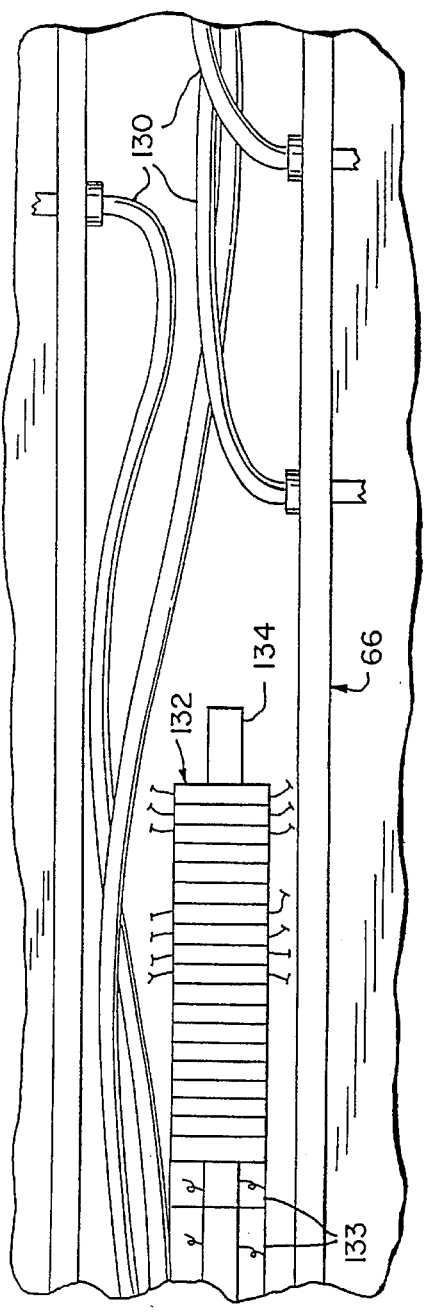
FIG. 6 provides a plan view of the inside of a typical wiring cabinet for housing power, communication and control lines in a product assembly platform in accordance with the present invention.

Referring now to FIG. 6, the cabinet 66 of the conduit 50 is typical of the cabinets 62, 64 and 66 and comprises a sheet metal enclosure which can be accessed by unscrewing and removing its outer cover. The cabinet 66 houses multiple sets of wires 130 for distributing power to the electrical machinery on the platform and for conducting control and communications signals between the electrical machinery on the deck 14 and the programmable controller system 90, the I/O rack 100, the robot controllers 26 and the vision system 110. Terminal strips 132 and control relays 133 are mounted on a DIN rail 134 within the cabinet 66. The terminal strips 132 allow for easy interconnection of the wiring within the cabinet 66 while the relays 133 provide for control in the immediate vicinity of platform machinery. The cabinets 62, 64 and 66 are characterized by access ports opening onto the deck 14 for passage of wiring to the electrical machinery and control equipment on and under the deck 14. The conduit 50 provides a highly useful function in allowing complete electrical interconnection all around the periphery of the deck 14 of the platform 10 thereby facilitating the efficient interconnection of the machinery and control equipment of the platform 10 and enabling convenient configuration and reconfiguration of the platform 10 for different product assembly applications.

Figure 7:
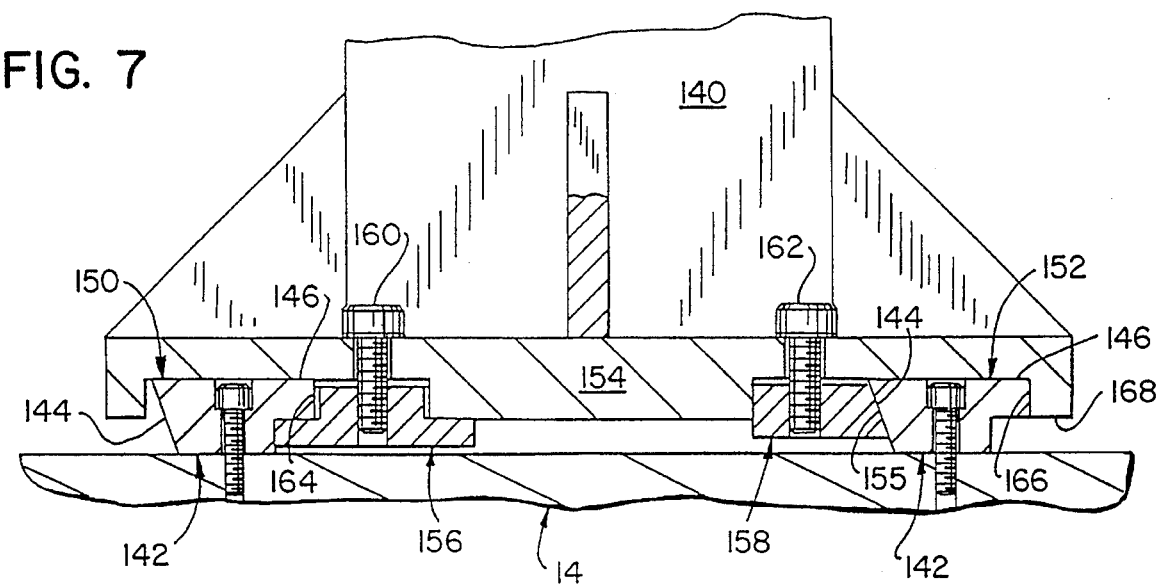
FIG. 7 provides a cross-sectional view of the mounting system for securing the pedestal of a robot or other assembly device onto the raised deck of a modular product assembly platform in accordance with the present invention.

Referring now to FIG. 7, the pedestals 140 for mounting the robots 16 are mounted onto the deck 14 using rails 142. The rails 142 run lengthwise across the deck 14 parallel with the conveyor 20. Each of the rails 142 has a special cross-section in the form of a modified T shape including a downward facing incline 144 on one lateral side and which intersects the deck 14 at an acute angle an overhanging ledge 146 on its other lateral side which intersects the deck 14 at a right angle. Each pedestal 140 mounts onto two rails 142 using two recessed tracks 150 and 152 running parallel across its base plate 154 and two mounting blocks 156 and 158 which can be drawn upward toward the plate 154 by bolts 160 and 162. The mounting block 156 has the shape of an inverted T for mating with a ledge 146 while the mounting block 158 has an incline 155 along one of its faces for mating with an incline 144. To provide vertical stability and alignment, the bolt 160 draws up the block 156 against the bottom 164 of the ledge 146 and the track 150 so that the rail, and more particularly, the ledge 146 is trapped between the block 156 and the plate 154. To provide horizontal alignment and stability, the bolt 162 draws up the block 158 against the incline 144 in order to push the outer lateral edge 166 of the ledge 146 of the rail 142 against the outer wall 168 of the track 152. Together the rails 142, tracks 150 and 152 and blocks 156 and 158 provide a very stable and accurate mounting and alignment system for the pedestals 140 and the robots 16.

Figure 8:
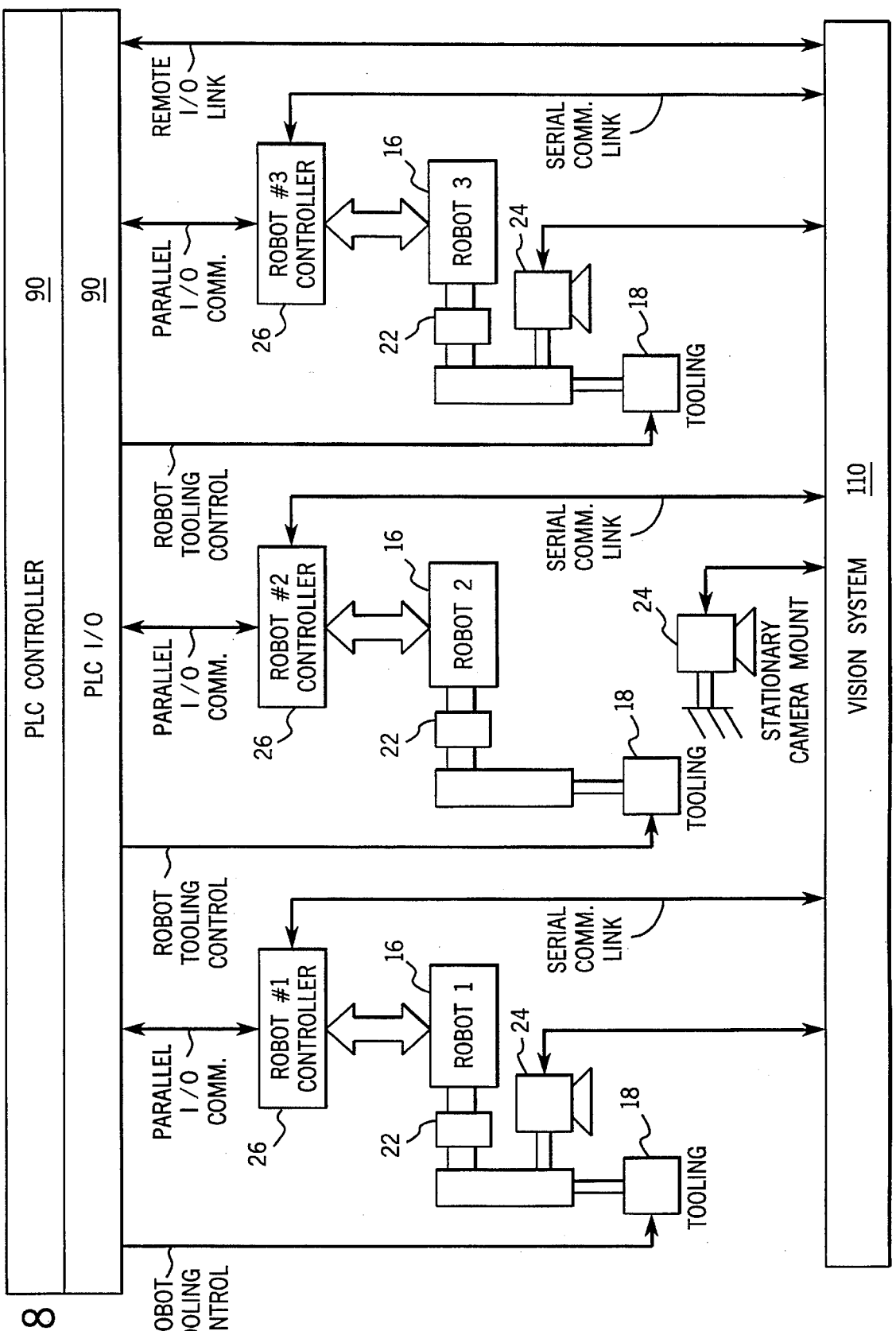
FIG. 8 provides an overall diagrammatic block diagram view of the control system and flow of control information for a product assembly platform in accordance with the present invention.

Referring now to FIG. 8, the electrical control system of the platform 10 includes the programmable logic controller system 90, the robot controllers 26 and the vision control system 110. The programmable logic controller system 90 is responsible for overall coordination and control of the electrical machinery on the platform 10. The robot controllers 26 direct the actual mechanics for "geographic" positioning of the robot arms 22 of the robots 16. The vision control system 110 receives video input from the cameras 24 associated with the robots 16 and in response performs various recognition and robot guidance functions with respect to which it may transmit data to the controller system 90 and/or robot controllers 26. When the robot arms 22 and parts 25 are in proper alignment the programmable logic controller system 90 actuates the tooling 18 to perform the appropriate assembly tasks.

Figure 9:
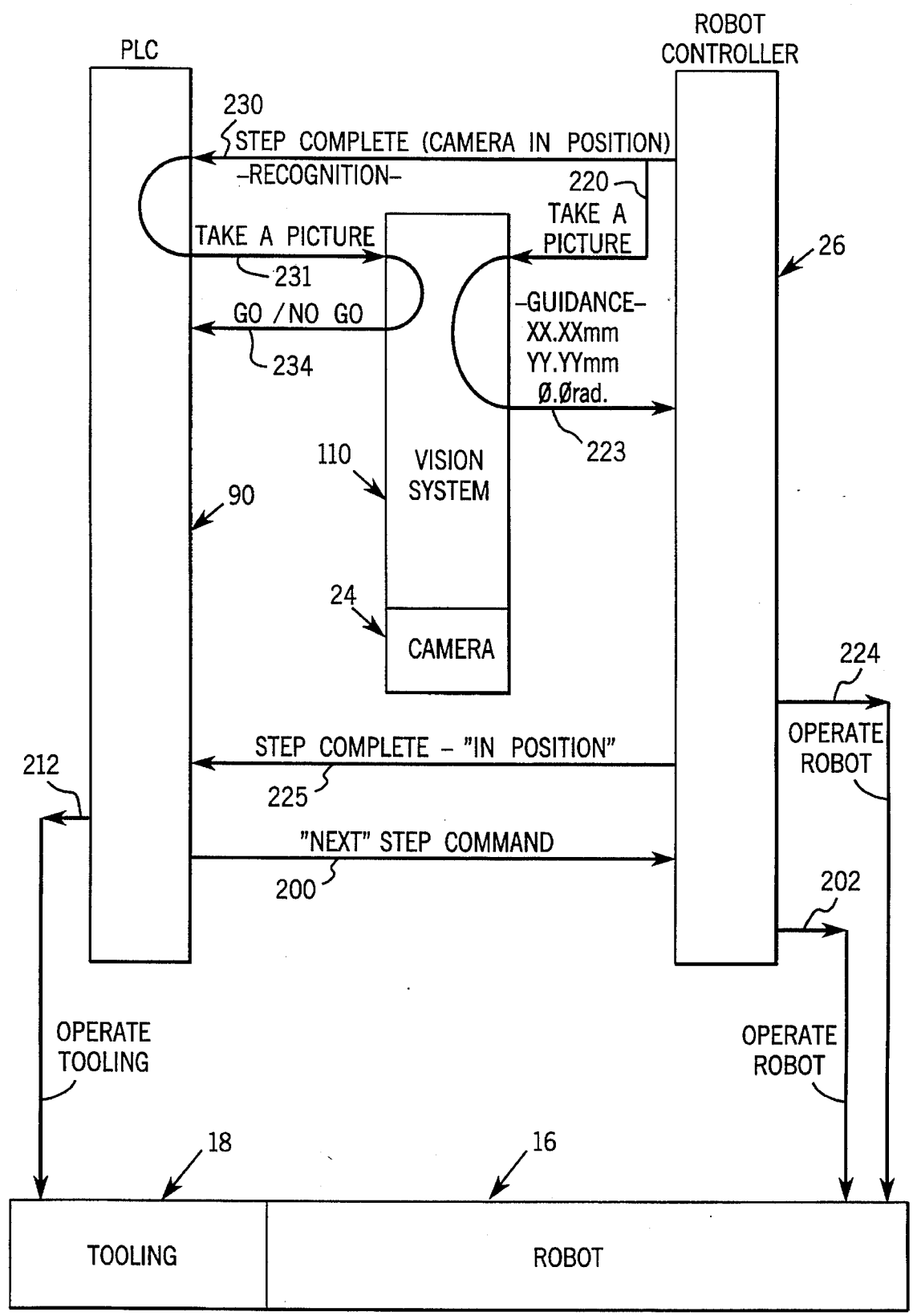
FIG. 9 provides a diagrammatic block diagram view with respect to a single robot depicting typical control information signal paths including vision recognition and/or robot guidance signal paths in accordance with the present invention.
Figure 10A:
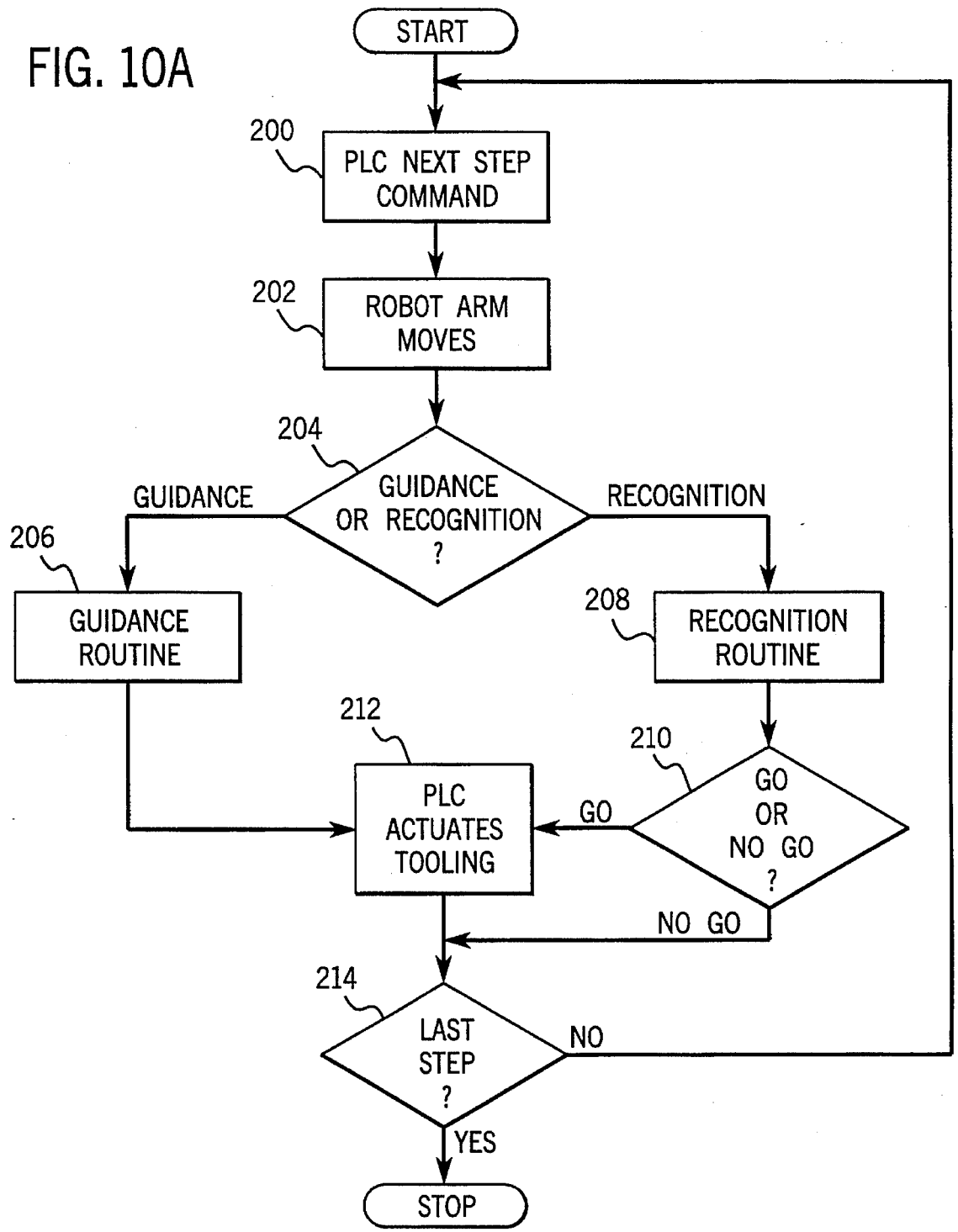

Referring now to FIGS. 9, 10A, 10B and 10C, the flow of control signals associated with a particular robot 16 in a typical control system as shown in FIG. 9 takes place in a series of sequential control steps as shown in FIGS. 10A, 10B and 10C. In step 200 the programmable controller system 90 signals the robot controller 26 that the next product assembly step should be undertaken. In response the robot controller 26 transmits control signals to the robot 16 for directing movements of the robot arm 22 and the arm 22 is repositioned in accordance with step 202 so that the camera 24 (mounted on arm 22) is in position to take a picture of a part. As indicated in step 204 different vision/control routines are followed for guidance or recognition applications (other types of vision/control routines could also be followed). If a robot guidance application is involved both the controller system 90 and vision system 110 "jointly" regulates operations in accordance with the guidance routine of FIG. 10B If a recognition application such as presence sensing or gauging is involved the controller system 90 regulates operations in accordance with the recognition routine of FIG. 10C.

Referring now to FIG. 10B, in a guidance application, the robot controller 26 signals the vision system 110 as per step 220 that the video camera 24 is in position to spot a part to be worked on in accordance with its most recent positioning of the robot arm 22. Thereafter, the vision system 110 controls the camera 24 to take a "picture" of the location where the part is positioned in accordance with step 221. After the picture is taken and the attributes of the image are analyzed by the vision system 110 per preprogrammed instructions in step 222, the vision system 110 transmits coordinates to the robot controller 26 in step 223 indicating the location and rotation of the part with respect to its own vision coordinate frame of reference. The robot controller 26 then transforms the vision coordinates into its own robot coordinate frame of reference (per a preprogrammed initial calibration procedure) and repositions the robot arm 22 to the desired position for further operations as per step 224 in accordance with the coordinate information from the vision system 110. Once the robot arm 22 has been moved into position the robot controller 26 signals the controller system 90 in step 225 that the robot arm 22 is now in position for the tooling operation to be performed.

Referring now to FIG. 10C, in a recognition application, the robot controller 26 signals the controller system 90 as per step 230 that the video camera 24 is in position to spot a part to be recognized in accordance with its most recent positioning of the robot arm 22. As indicated in step 231 the controller system 90 then signals the vision system 110 that the camera 24 is in position and, thereafter, the vision system 110 controls the camera 24 to take a picture of the location where the part may be located in accordance with step 232. After the picture is taken and the attributes of the image are analyzed by the vision system 110 per preprogrammed instructions in step 233, the vision system 110 transmitted either a "Go" or "No Go" signal to the controller system 90 based on its analysis of the presence or characteristics of the part.

Referring back to FIG. 10A, following the execution of the guidance routine of step 206, the controller system 90 transmits appropriate control signals for actuating the tooling 18 to perform the assembly task associated with the current assembly process step as indicated in step 212. After a short delay for the tooling to accomplish its task, the controller system 90 proceeds to the final step 214. On the other hand, following the execution of the recognition routine of step 208, the controller system 90 responds to the "Go" or "No Go" signal from the vision system 110 in accordance with step 210 by either actuating the tooling 18 pursuant to step 212 in the case of a "Go" signal or proceeding to step 214 in the case of a No Go signal. In step 214, the controller system 90 queries whether the last step in the overall assembly procedure has now been executed and either halts operations if the last step has been executed or jumps back to step 200 if the last step has not been executed.

Referring now to FIG. 11, multiple product assembly platforms 10a–f having different configurations of robots 16 may be used in combination to perform complicated assembly procedures comprising multiple assembly steps. In particular, the product assembly platforms 10a and 10e and 10f feed parts to the main assembly line consisting of platforms 10b, 10c and 10d where the parts are incorporated into the final product at platforms 10c and 10d, respectively. A network controller 250 is in communication with the programmable controller systems on platforms 10b–f and conveyance device 256 for coordinating platform operations and regulating the operation of the conveyance device 256 for controlling the transfer of parts between platforms. The modular nature of the platforms 10a–f allows them to be used as building blocks in assembly systems for factories. The platforms 10a–f have a great advantage in that they can be easily reprogrammed or reconfigured in new arrangements for the assembly of different products without rebuilding and retooling of the entire factory floor on which the platforms are installed.

While particular embodiments of the present invention have been shown and described, it should be clear that changes and modifications may be made to such embodiments without departing from the true scope and spirit of the invention. It is intended that the appended claims cover all such changes and modifications.

We claim:

1. A modular product assembly platform, comprising:
    a plurality of industrial robots adapted for assembly tasks including robot arms and robot tools;
    a deck for mounting said industrial robots having first and second sides and first and second ends including means for detachably mounting said robots;
    a plurality of robot controllers for controlling the geographic positioning of said robot arms including said robot tools;
    a conveyance system for transporting parts or products under assembly across said deck past said robots;
    a programmable controller mounted at said first end of said deck for coordinating the operations of said robots by controlling the positioning of said robots arms through said robot controllers, by directly controlling said robot tools and by directly controlling said conveyance system for product assembly; and
    a user configurable vision system mounted on said second end of said deck for use in identifying and locating products or parts in coordination with the operation of said industrial robots.

2. The product assembly platform of claim 1, wherein said means for detachably mounting includes a set of standardized mounting rails secured to a planar mounting bed and said platform further includes one or more standardized sets of utility service outlets along said first side of said deck adjacent to said mounting bed.

3. The product assembly platform of claim 1, further including a control console mounted along said first side of said deck for communicating with said controller and enabling operator control over said platform and a message display device mounted above said control console and connected to said programmable controller.

4. A product assembly network which may be readily reconfigured to assemble different products, comprising:
    A) a plurality of modular product assembly platforms each of which includes:
        a deck for mounting industrial robots having mounting gear for mounting said robots onto said deck,
        a plurality of industrial robots adapted for performing product assembly tasks which are detachably mounted on said deck and each of which includes a movable robot arm and a robot tool attached to this arm,
        a conveyance system for transporting products under assembly across said mounting deck past said robots,
        a plurality of robot controllers one of which is associated with each of said robots for controlling the geographic positioning of the arm of the robot with which each robot controller is associated,
        a programmable controller for regulating and coordinating the operations of said robots by actuating said robot controllers to control said robots in performing robot arm positioning operations and directly controlling the operation of said robot tools on said robots and said conveyance system for product assembly purposes; and B) means for conveying products and parts between said modular platforms; and C) a network controller in communication with said programmable controllers on said platforms for regulating and coordinating the operations of said platforms and said means for conveying products or parts.

5. The product assembly network of claim 4, wherein said network controller comprises a programmable controller which is integrated with an information processing system capable of executing general purposes computer programs.

6. The product assembly network of claim 4, wherein said platforms further include user configurable vision systems for use in detecting the position of products or parts in coordination with one or more of said robots on said platforms.

7. The product assembly network of claim 4, wherein said platforms further include a control console mounted along one side of each of the platforms which is connected to and in communication with the programmable controller for the platform.

8. The product assembly network of claim 7, wherein the mounting gear one each of said platforms includes a set of standardized mounting rails and each platform further includes one or more standardized sets of utility service outlets adjacent to said mounting deck.

9. The product assembly network of claim 7, wherein each of said platforms further include a message display device mounted above said control console and connected to and in communication with the programmable controller for the platform.

10. A modular product assembly platform, comprising:

a plurality of industrial assembly machines;

a deck for mounting said assembly machines;

a set of mounting gear for detachably securing said assembly machines onto said deck at variable locations including;

a set of mounting rails characterized by a modified T shape having an incline on one lateral side which intersects said deck at an acute angle and a notch its on the other lateral side which intersects said deck at a right angle;

a plurality of machine control units mounted under said deck and connected to said machines for controlling said machines;

a conveyance system for transporting products under assembly across said mounting bed past said assembly machines from a first side of said bed to a second side of said bed;

a programmable controller connected to said machine control units for controlling and coordinating the operations of said machines and said conveyance system for product assembly purposes; and a control console mounted along a third side of said platform for communicating with said programmable controller.

11. The product assembly platform of claim 10, further including a data display unit for displaying messages pertinent to operations taking place on the platform which is mounted above said control console and connected to said programmable controller.

* * * * *